United States Patent
Pinney et al.

(10) Patent No.: US 8,315,550 B2
(45) Date of Patent: Nov. 20, 2012

(54) ADJUSTING PAPER EJECTING SPEED TO COLLATE PRINTED MATTERS

(75) Inventors: Shaun Pinney, Fremont, CA (US); Hoa Hu, Belmont, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 419 days.

(21) Appl. No.: 12/750,856

(22) Filed: Mar. 31, 2010

(65) Prior Publication Data

US 2011/0242577 A1  Oct. 6, 2011

(51) Int. Cl.
*G03G 15/00* (2006.01)

(52) U.S. Cl. ......... 399/404; 399/405; 399/403; 271/207

(58) Field of Classification Search .................. 271/207; 399/403, 404, 405; 414/791.2; 270/58.11
See application file for complete search history.

(56) References Cited

U.S. PATENT DOCUMENTS

| | | | | |
|---|---|---|---|---|
| 4,861,213 A * | 8/1989 | Fuchs | ........................ | 414/791.2 |
| 5,427,367 A * | 6/1995 | Kimura et al. | ................ | 271/185 |
| 5,512,996 A * | 4/1996 | Fare | .............................. | 399/404 |
| 6,227,531 B1 * | 5/2001 | Guerrero et al. | ........... | 270/58.31 |
| 6,480,697 B2 * | 11/2002 | Kojima | ......................... | 399/404 |
| 7,448,615 B2 * | 11/2008 | Takamura | ..................... | 271/176 |
| 7,577,396 B2 * | 8/2009 | Kitano | .......................... | 399/405 |
| 2006/0214348 A1 * | 9/2006 | Blanchard et al. | ......... | 270/58.31 |

* cited by examiner

*Primary Examiner* — Kaitlin S Joerger
*Assistant Examiner* — Ernesto Suarez
(74) *Attorney, Agent, or Firm* — Buchanan Ingersoll & Rooney PC

(57) ABSTRACT

A method executed by an image forming apparatus for producing a print job, which includes the steps of: (a) receiving data representing a document to be printed in the print job; (b) receiving job information about the print job, the job information including an instruction to print multiple copies of the document; (c) printing the multiple copies of the document; and (d) ejecting one sheet of each of the multiple copies of the document at an ejection speed, that is either greater than or less than an ejection speed of the other sheets of the multiple copies of the document.

19 Claims, 5 Drawing Sheets

ADJUSTING PAPER EJECTING SPEED TO COLLATE PRINTED MATTERS

FIELD OF THE INVENTION

This invention relates to an image forming apparatus and, more particularly to a system and method of collating sheets for a print job that includes multiple copies using a single output tray.

BACKGROUND OF THE INVENTION

Collation of multiple copies of a printed document is typically accomplished with multi function peripheral (MFP) devices by either using multiple trays and/or by shifting each collated set of the document. However, it can be appreciated that smaller image forming apparatuses including the all-in-one (AIO) may not have the capacity and/or functional ability to perform shifting of each collated set of documents.

Accordingly, it would be desirable to have a method and system wherein collation of multiple copies of a document can be achieved without the use of multiple trays and/or shifting of each collated print copy.

OBJECTS AND SUMMARY

The present invention has been made in consideration of the above issues, and provides an improved image forming apparatus and method by adjusting the paper eject speed for collated print copies.

In accordance with an exemplary embodiment, a method executed by an image forming apparatus for producing a print job, comprises: (a) receiving data representing a document to be printed in the print job; (b) receiving job information about the print job, the job information including an instruction to print multiple copies of the document; (c) printing the multiple copies of the document; and (d) ejecting one sheet of each of the multiple copies of the document at an ejection speed, that is either greater than or less than an ejection speed of the other sheets of the multiple copies of the document.

In accordance with another exemplary embodiment, a computer program product comprising a computer usable medium having a computer readable code embodied therein for controlling an image forming apparatus, the computer readable program code configured to cause the image forming apparatus to execute a process for producing a print job, the process comprising the steps of: (a) receiving data representing a document to be printed in the print job; (b) receiving job information about the print job, the job information including an instruction to print multiple copies of the document; (c) printing the multiple copies of the document; and (d) ejecting one sheet of each of the multiple copies of the document at an ejection speed, that is either greater than or less than an ejection speed of the other sheets of the multiple copies of the document.

In accordance with a further exemplary embodiment, an image forming apparatus comprises: a memory unit, the memory unit having a firmware application which performs the following: (a) receiving data representing a document to be printed in the print job; (b) receiving job information about the print job, the job information including an instruction to print multiple copies of the document; (c) printing the multiple copies of the document; and (d) ejecting one sheet of each of the multiple copies of the document at an ejection speed, that is either greater than or less than an ejection speed of the other sheets of the multiple copies of the document; and a print engine connected to the memory unit for forming an image on a recording medium.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
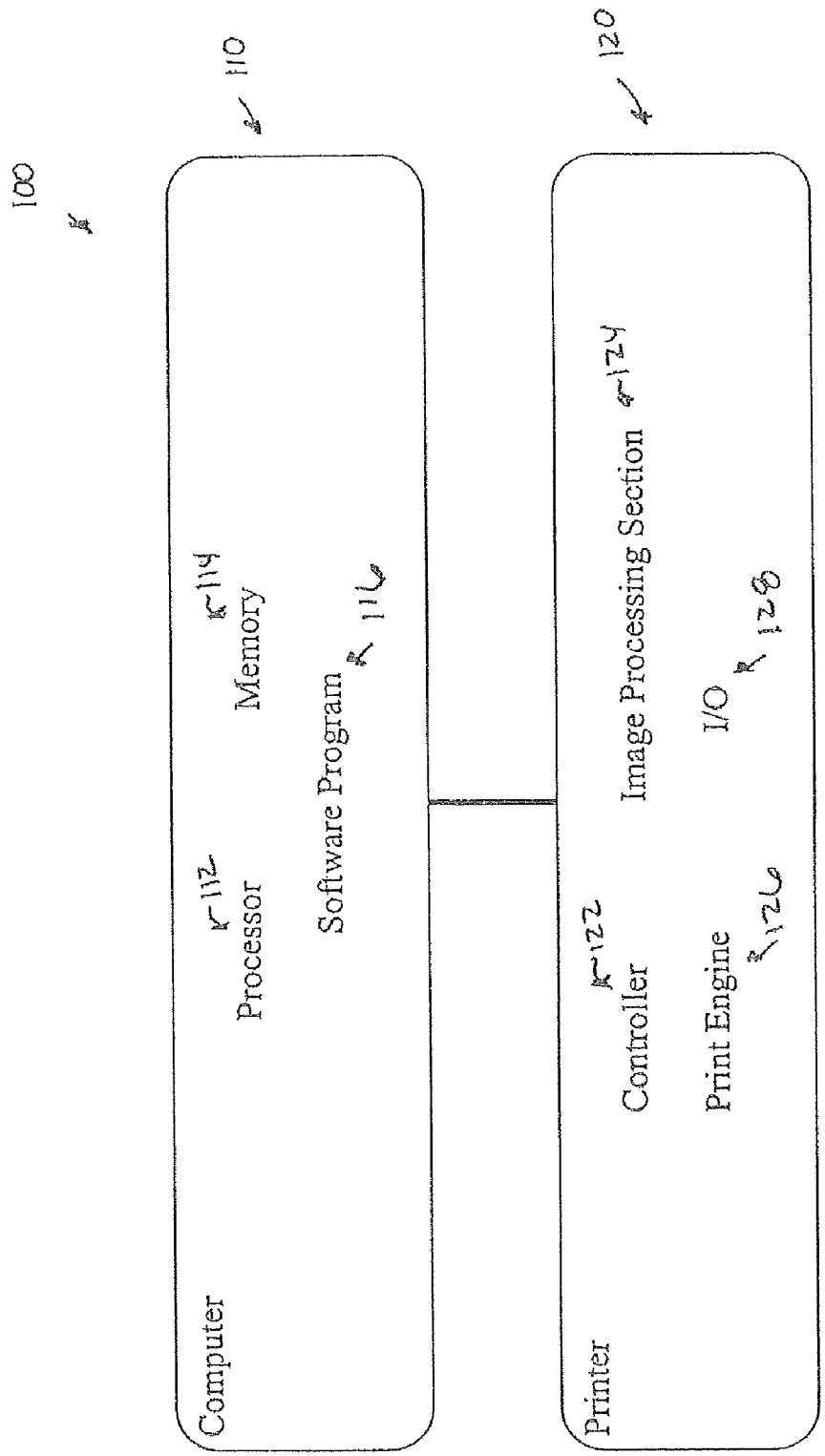
FIG. 1 is a data processing system, which includes a host computer and an image forming apparatus or printer connected to the host computer in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

The methods described herein can be implemented in a data processing system 100 which includes a host computer 110 and an image forming apparatus in the form of a printer 120 connected to the host computer 110. A typical structure of the data processing system is shown in FIG. 1. The host computer 110 includes a processor 112 and one or more memories 114 for storing software programs 116 and data (such as files to be printed). The host computer 110 submits print jobs to the image forming apparatus (or printer) 120 by transmitting data representing the documents to be printed and information describing the print job. The image forming apparatus (or printer) 120 typically includes a controller 122, an image processing section 124, a print engine 126, and an input/output (I/O) section 128.

The controller 122 may include a central processing unit (CPU), a random access memory (RAM), and a read only memory (ROM). The controller 122 processes the data and job information received from the host computer 110 to generate a print image. The image processing section 124 carries out various image processing under the control of the controller 122, and sends the processed print image data to the print engine 126. The print engine 126 forms an image on a recording sheet based on the image data sent from the image processing section 124. The I/O section performs data transfer with the host computer 110. The controller 122 is programmed to process data and control various other components of the image forming apparatus or printer 110 to carry out the various methods described herein.

Figure 2:
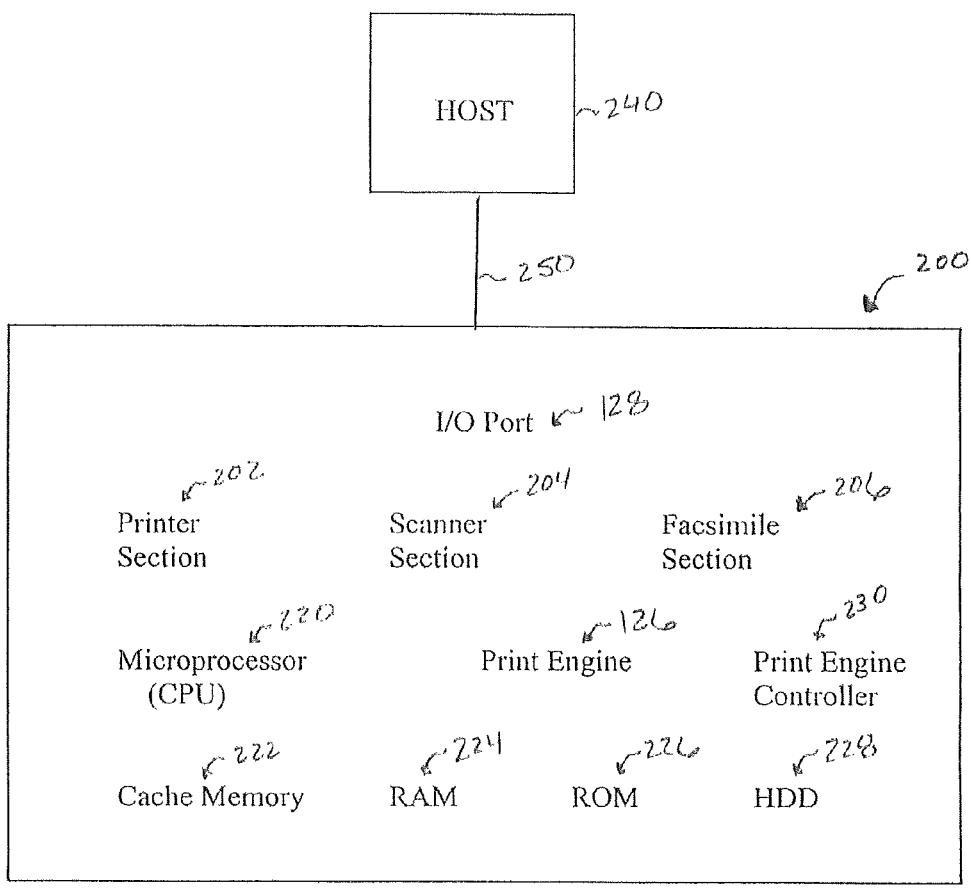
FIG. 2 is a diagram showing the configuration of an image forming apparatus in accordance with an exemplary embodiment of the present invention.

FIG. 2 is a diagram showing the configuration of an image forming apparatus 200 in accordance with an exemplary embodiment of the present invention. In accordance with an exemplary embodiment, the image forming apparatus 200 is configured as a multi function peripheral (MFP) device or all-in-one (AIO) that includes a printer section 202 for converting print data inputted from outside to image data and forming and printing out the converted image onto a sheet, a scanner section 204 for optically reading a document, and a facsimile section 206 for facsimile receiving and transmitting image data to and from external apparatuses through public lines.

In accordance with an exemplary embodiment, the printer section 202 carries out a function for forming and outputting an image corresponding to the image data onto the recording sheet using an electro-photographic process. In accordance with an exemplary embodiment, the printer section 202 is configured as a so-called laser printer having a recording sheet conveying device (not shown in the drawing), a photoreceptor drum, a charging unit, an LD (Laser Diode) being modulated lighting corresponding to the image data inputted, a scanning unit for scanning the laser light irradiated from the LD on the photoreceptor drum, a developing unit, a transfer and separation unit, a cleaning unit, and a fixing unit.

The scanner section 204, which includes the copying section carries out a function to read a document and obtain the image data and comprises a light source, a CCD (Charge Coupled Device) image sensor for reading the document by one line at a time in a width direction, and an A/D converter for converting an analogue image signal outputted by the image sensor to digital image data. Although not shown in the drawing, the scanner section 204 further comprises a moving mechanism for moving the reading position per one line of the image sensor in a longitudinal direction of the document and optical parts comprising a lens and a mirror for guiding the reflected light from the document and focusing image on the image sensor.

The facsimile section 206 connects to a public line (not shown) and has a function to compress and expand the image data with the compression mode complying with facsimile, and a function to control various communication protocols for sending and receiving facsimile through the public line.

In accordance with an exemplary embodiment, the image forming apparatus 200 includes a print engine 126, which is controlled by a microprocessor (or CPU) 220. The microprocessor 220 communicates with other elements of the apparatus and includes a cache memory 222. A print engine controller (or printer controller) 230 and the associated print engine 126 provides the print output capability for the printer section 202. A random access memory (RAM) 224 provides a main memory for the printing section 202 for storing and processing a print job data stream received from the client device or host computer 240. A read only memory (ROM) 226 and Hard Disk Drive (HDD) 228 holds firmware which controls the operation of microprocessor 220 and print engine 126. Here, the firmware includes software applications for executing basic controls of various hardware of the image forming apparatus 200, and an embedded Operating System (OS), which controls the operation of the image forming apparatus 200. Code procedures stored in memory (ROM) 226 include, for example, a page converter, rasterizer, compression code, page print scheduler and print engine manager.

An input/output (I/O) port 128 provides communications between the printer section 202 and a client device (or host) 240 and receives page descriptions (or print data) from the host for processing within the image forming apparatus 200. In accordance with an exemplary embodiment, the operation of printer section 202 commences when it receives a page description from client device (or host) 240 via I/O port 128 in the form of a print job data stream.

In accordance with an exemplary embodiment as shown in FIG. 2, the image forming apparatus (or printer) 200 and the client device (or host) 240 are connected to each other via a network (e.g., LAN or WAN) 250. In accordance with an exemplary embodiment, the image forming apparatus 200 receives a print job from the client device or host 240, which is then printed onto at least one sheet of paper and/or other printable medium. Examples of the network consistent with embodiments of the invention include, but are not limited to, the Internet, an intranet, a local area network (LAN) and a wide area network (WAN). The image forming apparatus 200 and the client device can be connected with a wire or be connected with wireless by using radio frequency (RF) and/or infrared (IR) transmission. Examples of image forming apparatuses 200 consistent with exemplary embodiments of the invention include, but are not limited to, a laser beam printer (LBP), an LED printer, a multi-functional laser beam printer including copy function (MFP). In accordance with an exemplary embodiment, the image forming apparatus 200 is preferably a color printer or a black and white (B/W) printer.

Figure 3:
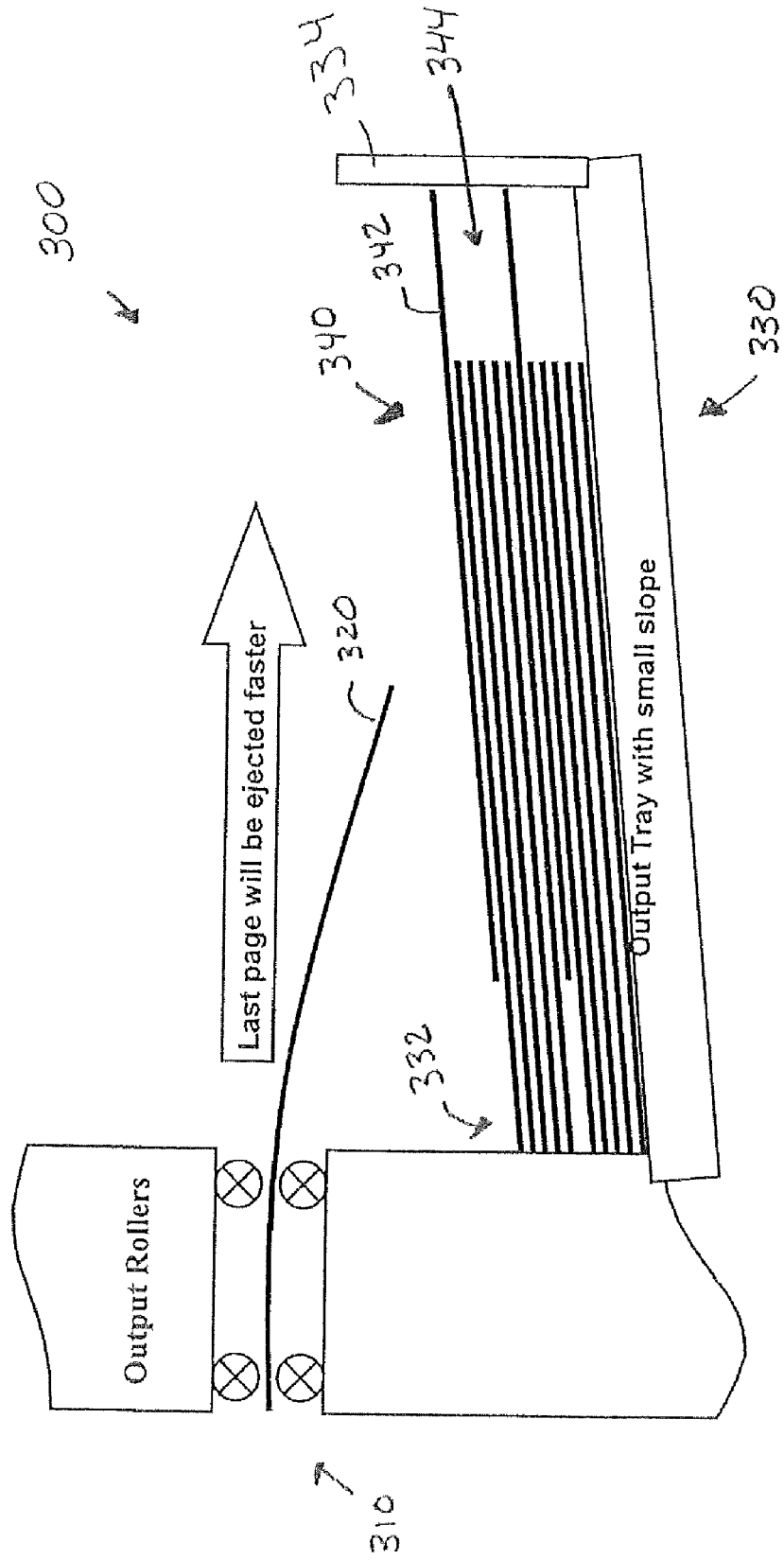
FIG. 3 is an illustration of an output portion of an image forming apparatus having an output tray in accordance with an exemplary embodiment of the present invention.

FIG. 3 is a side view of an output portion of image forming apparatus 300 in accordance with an exemplary embodiment wherein collation of multiple copies of a document can be achieved without the use of multiple trays and/or shifting of each collated copy. As shown in FIG. 3, the image forming apparatus 300 includes a plurality of output rollers 310, which eject printed sheets (or recording medium) 320 onto an output tray 330 upon completion of the printing process. It can be appreciated that the output tray 330 can be an output tray extension, which is often found on all-in-ones (AIO).

Typically, the output rollers 310 operate at a single (or uniform) speed such that the printed sheets 320 are ejected or discharged from the image forming apparatus 300 at a uniform speed and stacked 340 in a corresponding uniform manner It can be appreciated that the output tray 330 is typically at an angle of at least 15 degrees, and more likely approximately 30 degrees, such that upon ejection or discharge from the image forming apparatus 300, the printed sheets 320 will slide into a lower portion 332 of the output tray 330 and form a uniform stack of printed sheets 320. The output tray 330 also preferably includes a lip (or outer wall) 334, which prevents the ejected sheets from leaving the confines of the output tray 330.

In accordance with an exemplary embodiment, the last page (or sheet) 342 of each set of printed copies (i.e., collated set of printed images) is ejected from the image forming apparatus 300 and corresponding plurality of rollers 310 at a different speed than the other sheets 320. In accordance with an exemplary embodiment, the last page (or sheet) 342 of each collated set of copies is ejected at a speed faster than the other sheets 344 of that collated set. It can be appreciated that by changing the motor speed of the plurality of output rollers 310, the last sheet 342 is shot further into the output tray 330 than the other sheets 344 of each collated set. In addition, by ejecting the last sheet 342 further into the output tray 330, this provides an easy method of locating the collated set of printed documents by a user upon removal of the stack 340 from the tray 330.

In accordance with an alternative embodiment, the last page (or sheet) 342 can be ejected from the image forming apparatus 300 and the corresponding plurality of rollers 310 at a speed less than the ejection speed of the other sheets 344 of each collated set of printed documents. Once again, it can be appreciated that by changing the motor speed of the plurality of output rollers 310 for the last page (or sheet) 342 of each set, the last page (or sheet) is ejected or shot closer to the image forming apparatus 300 than the outer sheets or pages 344 of the collated set of printed documents or images.

In accordance with an exemplary embodiment, rather than the last sheet, the first sheet of each set of collated documents can be ejected at a speed, that is either greater than or less than the ejection speed of the other sheets of the collated set.

Figure 4:
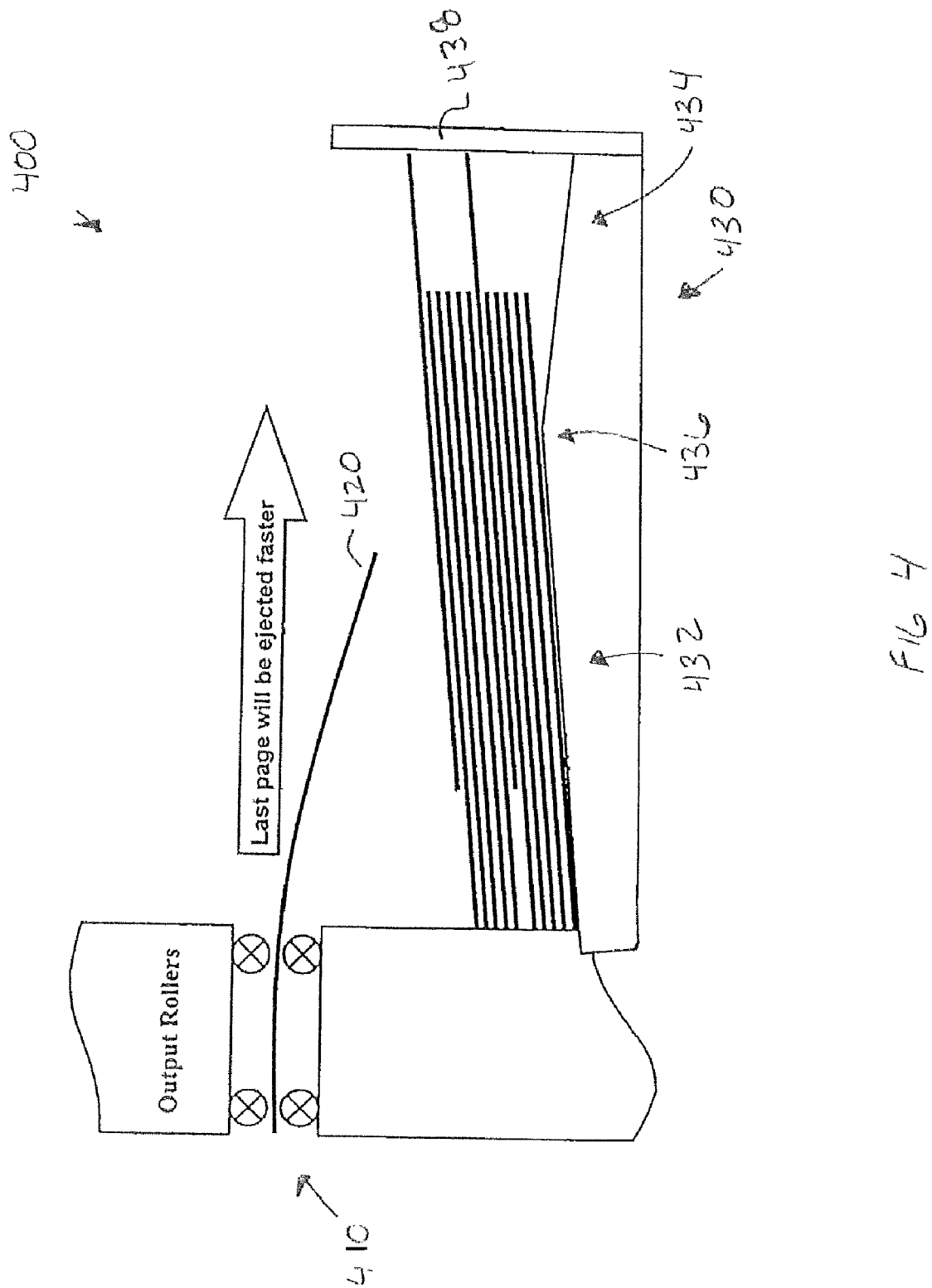
FIG. 4 is an illustration of an output portion of an image forming apparatus having an output tray in accordance with another exemplary embodiment.

FIG. 4 is a side view of an output portion of an image forming apparatus 400 in accordance with an exemplary embodiment. As shown in FIG. 4, the image forming apparatus 400 includes a plurality of output rollers 410, which ejects a printed sheet 420 onto an output tray 430 upon completion of the printing process. As shown in FIG. 4, in accordance with an exemplary embodiment, the output tray 430 has an inner portion 432 which slopes towards the image forming apparatus 400, and an outer portion 434, which slopes away from the image forming apparatus 400. The inner portion 432 and the outer portion 434 of the output tray 430 is preferably sized to assist with the collation of the multiple copies and corresponding collated sheets, which are ejected further into the tray and/or alternatively ejected closer to the image forming apparatus 400. The output tray 430 also preferably includes a lip (or wall) 438, which prevents the ejected sheets from leaving the confines of the output tray 430.

The output tray 430 in accordance with another exemplary embodiment can include a moveable ridge 436, which separates the inner portion 432 and the outer portion 434. The moveable ridge 436 moves from side to side within the output tray 430 to accommodate sheets of paper or other mediums having different lengths and widths. In accordance with a preferred embodiment, the movement of the moveable ridge 436 is relative to the width of the ejected sheets of paper and/or other mediums.

In accordance with another exemplary embodiment, the motor speed of the output rollers 310, 410 can be adjusted based on sheet size and/or type of print medium. A software application associated with the firmware of the image forming apparatus or printer 300, 400 preferably controls the ejection speed of the output rollers 310, 410 and corresponding motors and/or other mechanical devices within the image forming apparatus 300, 400.

Figure 5:
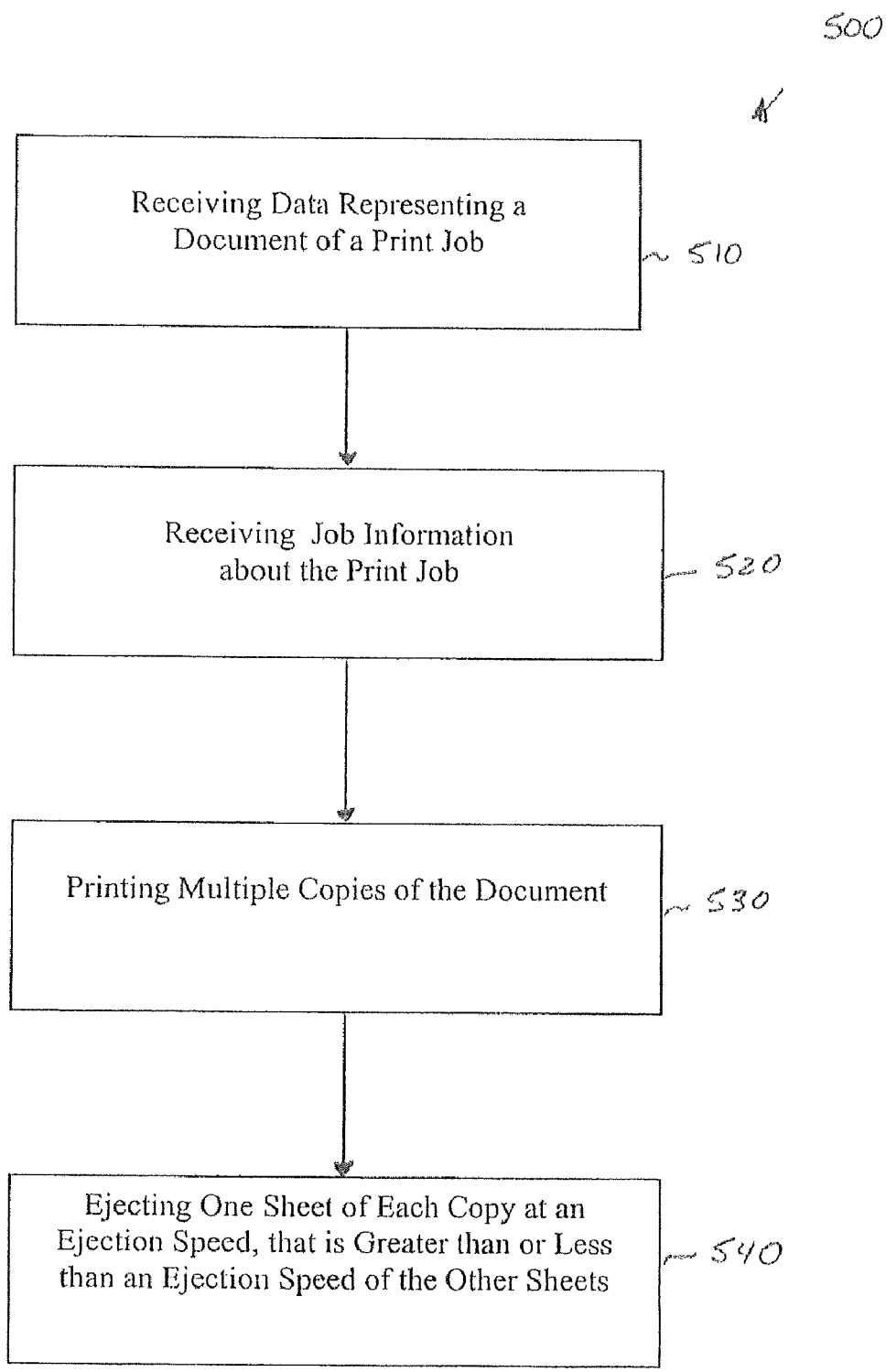
FIG. 5 is a flow chart of a method executed by an image forming apparatus for producing a print job in accordance with an exemplary embodiment.

FIG. 5 is a flow chart of a method executed by an image forming apparatus for producing a print job 500, comprises the steps of: (a) receiving data representing a document to be printed in the print job 510; (b) receiving job information about the print job, the job information including an instruction to print multiple copies of the document 520; (c) printing the multiple copies of the document 530; and (d) ejecting one sheet of each of the multiple copies of the document at an ejection speed, that is either greater than or less than the ejection speed of the other sheets of the multiple copies of the document 540. It can be appreciated that the methods as described herein can also be implemented by a computer program product comprising a non-transitory computer usable medium having a computer readable code embodied therein for controlling an image forming apparatus, the computer readable program code configured to cause the image forming apparatus to execute a process for producing a print job as described herein. In accordance with an exemplary embodiment, step (a) includes scanning an original hard copy of the document on the image forming apparatus to generate the data representing the document to be printed, and step (b) includes receiving the job information from an input panel of the image forming apparatus.

In accordance with another exemplary embodiment, the job information includes a parameter indicating whether a first or a last sheet of each sheet of each set of the multiple copies of the document is either greater ejected at a speed that is greater than or less than the ejection speed of each of the other sheets of each set of the request multiple copies of the document.

It can be appreciated that the process and method can be introduced into the apparatus by updating the firmware in the non-volatile memory of the image forming apparatus. In this regard, the method may be brought to the apparatus in a form of a package of install software and the firmware, which may be divided and/or compressed so that the install software effectively installs the firmware. The package may be steadily stored in a computer readable diskette, such as a compact disk, or may be transmitted through a wire/wireless communication line.

The method described above can be used to print on paper or other suitable printing medium such as thin plastic sheets, etc. The computer readable medium, of course, can be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention can be implemented such that its software part has been written onto a recording medium in advance and will be read as required in operation.

Thus, as used in this disclosure and the appended claims, the term "image forming apparatus", "printer" or "printing device" should be broadly understood to refer to any machine that has a print function, including printers, copiers, and all-in-one machines which have printing, scanning and copying functions. The term "print job" and/or "printing" similarly include both printing and copying, i.e., it refers to producing images on a recording medium either from a data received from an external device such as a host computer or from data generated by scanning an original hard copy.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method executed by an image forming apparatus for producing a print job, comprising:
   (a) receiving data representing a multi-page document to be printed in the print job;
   (b) receiving job information about the print job, the job information including an instruction to print a plurality of sets of the multi-page document;
   (c) printing the plurality of sets of the multi-page document; and
   (d) ejecting the plurality of sets onto an output tray, wherein one sheet of each of the plurality of sets of the multi-page document is ejected at a first ejection speed, that is either greater than or less than a second ejection speed of the other sheets in each set of the multi-page document.

2. The method of claim 1, wherein the first ejection speed is greater than the second ejection speed.

3. The method of claim 1, wherein the first ejection speed is less than the second ejection speed.

4. The method of claim 1, wherein the plurality of sets of the multi-page document are ejected onto a single output tray.

5. The method of claim 1, further comprising ejecting the plurality of sets of the multi-page document onto an output tray having a slope of less than 15 degrees.

6. The method of claim 1, further comprising ejecting the plurality of sets of the multi-page document onto an output tray having an inner portion which is sloped towards the image forming apparatus and an outer portion, which slopes away from the image forming apparatus.

7. The method of claim 6, further comprising a moveable ridge, which separates the inner portion and the outer portion, and wherein the moveable ridge accommodates sheets of different lengths and widths.

8. The method of claim 1, wherein the one sheet of each of the plurality of sets of the multi-page document, which is ejected at the first ejection speed, that is either greater than or less than the second ejection speed of the other sheets of the plurality of sets of the multi-page document is a first sheet of each set of the multi-page document.

9. The method of claim 1, wherein the one sheet of each of the plurality of sets of the multi-page document, which is ejected at the first ejection speed, that is either greater than or less than the second ejection speed of the other sheets of the plurality of sets of the multi-page document is a last sheet of each set of the multi-page document.

10. The method of claim 1, wherein the job information includes a parameter indicating whether the first ejection speed is either greater than or less than the second ejection speed.

11. The method of claim 1, wherein in steps (a) and (b), the data and the job information are received from a host computer connected to the image forming apparatus.

12. The method of claim 1, wherein step (a) includes scanning an original hard copy of the document on the image forming apparatus to generate the data representing the document to be printed, and wherein step (b) includes receiving the job information from an input panel of the image forming apparatus.

13. The method of claim 1, further comprising a firmware application within the image forming apparatus, which controls the first and second ejection speeds.

14. A computer program product comprising a non-transitory computer usable medium having a computer readable code embodied therein for controlling an image forming apparatus, the computer readable program code configured to cause the image forming apparatus to execute a process for producing a print job, the process comprising the steps of:
   (a) receiving data representing a multi-page document to be printed in the print job;
   (b) receiving job information about the print job, the job information including an instruction to print a plurality of sets of the multi-page document;
   (c) printing the plurality of sets of the multi-page document; and
   (d) ejecting the plurality of sets onto an output tray, wherein one sheet of each of the plurality of sets of the multi-page document is ejected at a first ejection speed, that is either greater than or less than a second ejection speed of the other sheets in each set of the multi-page document.

15. The computer program product of claim 14, wherein the first ejection speed is greater than the second ejection speed.

16. The computer program product of claim 14, wherein the first ejection speed is less than the second ejection speed.

17. An image forming apparatus comprising:
   a memory unit, the memory unit having a firmware application which performs the following:
      (a) receiving data representing a multi-page document to be printed in the print job;
      (b) receiving job information about the print job, the job information including an instruction to print a plurality of sets of the multi-page document;
      (c) printing the plurality of sets of the multi-page document; and
      (d) ejecting the plurality of sets onto an output tray, wherein one sheet of each of the plurality of sets of the multi-page document is ejected at a first ejection speed, that is either greater than or less than a second ejection speed of the other sheets in each set of the multi-page document; and
   a print engine connected to the memory unit for forming an image on a recording medium.

18. The image forming apparatus of claim 17, wherein the output tray has an inner portion which is sloped towards the image forming apparatus and an outer portion, which slopes away from the image forming apparatus.

19. The image forming apparatus of claim 18, further comprising a moveable ridge, which separates the inner portion and the outer portion of the output tray, and wherein the moveable ridge moves from side to side to accommodate sheets of different lengths and widths.

* * * * *